United States Patent Office 2,797,771
Patented July 2, 1957

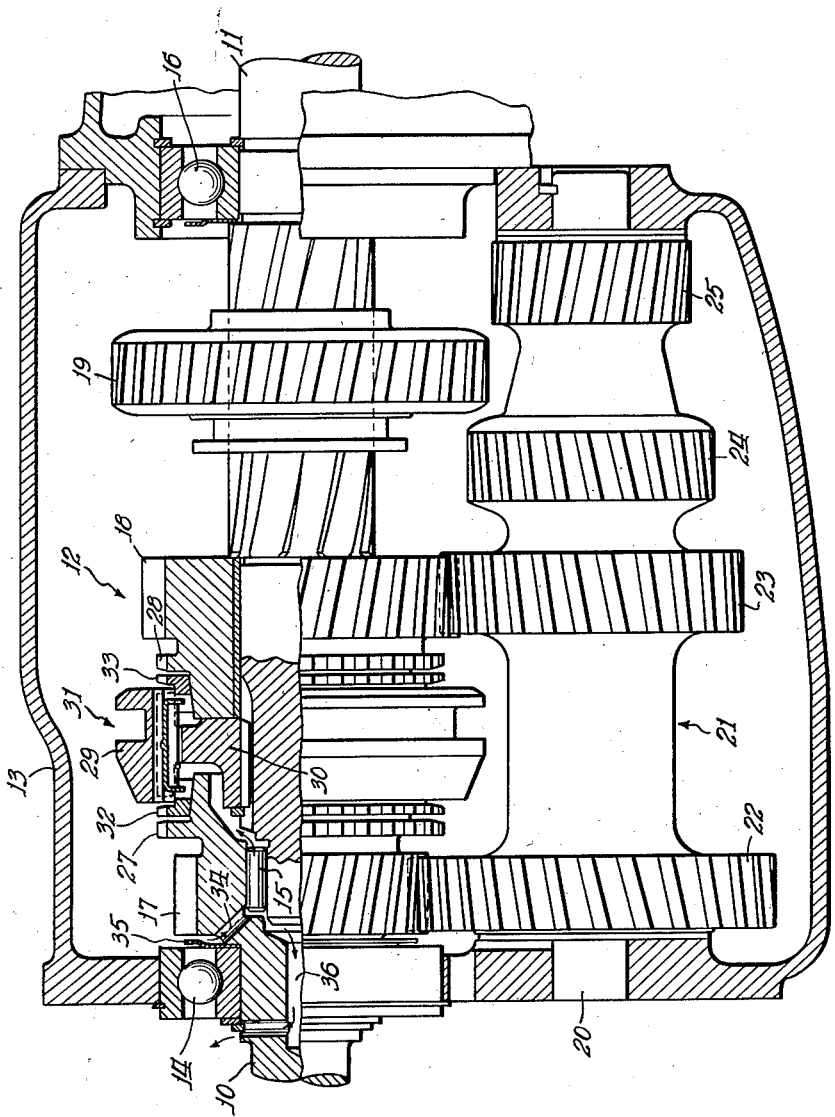

2,797,771

LUBRICATING SYSTEM FOR TRANSMISSION

Palmer Orr, Muncie, Ind., assignor to Borg-Warner Corporation, Chicago, Ill., a corporation of Illinois Application November 8, 1954, Serial No. 467,455

3 Claims. (Cl. 184—11)

My invention relates to a transmission, or more particularly to an improvement in the lubricating system of a transmission, in which there is included a new construction for lubricating a pilot bearing contained therein.

The principal object of my invention, then, is to provide an improved arrangement for lubricating a pilot bearing in a transmission by means of oil thrown off the transmission gears.

For many years previous to this, the pilot bearings were lubricated by oil inlet holes that were vertically positioned with respect to the bearings and passed through the center of a main drive gear. By redesigning and relocating the oil inlet holes in a transmission drive gear my invention has advantageously succeeded in utilizing this gear as a pump for circulating the lubricating oil that has been placed under high pressure by a meshing of a drive gear with a countershaft gear.

It is therefore a specific object of my invention to provide oil inlets positioned at an angle to the pilot bearing in order to promote better lubrication of the pilot bearing.

It is also an important object of my invention to relocate the oil inlet holes in the transmission drive gear in order to more fully utilize this gear as a pump for circulating the lubricating oil that has been placed under high pressure by the meshing of the drive gear with the countershaft gear.

The above and other objects, features and advantages of this invention disclosed herein, will become apparent to persons skilled in the art from reading of the following specification and claims taken in connection with the appended drawing which forms a part of this specification and wherein:

The figure shown is a partial longitudinal, sectional view of a transmission embodying the principles of the invention.

Like characters of reference designate like parts in the several views.

Referring to the drawing, the illustrated transmission comprises, in general, a drive shaft 10, a driven shaft 11 and a countershaft type transmission unit 12 that is effectively interposed between the shafts 10 and 11. The shaft 10 is adapted to be connected to the engine of the vehicle (not shown) in which the transmission is installed, and the shaft 11 is adapted to the driving road wheels (not shown) of the vehicle by means of any suitable connecting mechanism (not shown). A transmission casing 13 is provided for the unit 12, and the shaft 10 is rotatably disposed within the casing 13 by means of a bearing 14. The shaft 11 is piloted within the shaft 10 by means of pocket or roller bearings, one of which is shown at 15, and is rotatably disposed within the casing 13 by means of a bearing 16.

The countershaft gear unit 12 comprises a main drive gear 17 formed on the shaft 10, a gear 18 rotatably disposed on the shaft 11 and a gear 19 splined on the shaft 11. A countershaft 20 is fixed within the transmission casing 13, and a countershaft cluster gear 21 is rotatably disposed on the shaft 20. The cluster gear 21 comprises gears 22, 23, 24 and 25, and the gears 22 and 23 are respectively in mesh with the gears 17 and 18. The gear 19 is adapted to be moved into mesh with the gear 24. The gear 25 is in mesh with an idler gear (not shown) rotatably disposed in the transmission casing 13 and the gear 19 is adapted to mesh also with the idler gear. The gears 17 and 18 are respectively provided with clutch teeth 27 and 28, and a clutch sleeve 29, slidably disposed on a hub member 30 which is fixed on the shaft 11, is adapted to mesh with both sets of the clutch teeth. Synchronizing mechanism 31 comprising blocker synchronizing rings 32 and 33 is provided for the clutch sleeve 29 and this mechanism functions to synchronize the teeth 27 or 28 with the sleeve 29 prior to engagement thereof and to prevent such engagement until synchronization.

The countershaft unit 12 provides low, intermediate and high speeds in forward drive and a drive in reverse. The gear 19 is shifted into mesh with the gear 24 for low speed forward drive and the gear train is then from the shaft 10 through the gears 17 and 22 and the gears 24 and 19 to the shaft 11. Second or intermediate forward speed is completed by engaging the clutch sleeve 29 with the teeth 28 and the power train is from the shaft 10 through the gears 17 and 22 and the gears 23 and 18, and through the clutch teeth 28, the sleeve 29 and the hub member 30 to the shaft 11. High speed forward drive is obtained by engaging the clutch sleeve 29 with the teeth 27 and the drive is from the shaft 10 through the teeth 27, the sleeve 29 and the hub member 30 to the shaft 11. Reverse drive is obtained by engaging the gear 19 with the idler gear and the drive is from the shaft 10 through the gears 17 and 22 and the gears 25 and 19 (through the idler gear) to the shaft 11.

The transmission arrangements hereinbefore described are quite similar to such arrangements which have been in use for some time, and I deem as the principal feature of my invention an improved arrangement for lubricating the pocket or roller bearings 15 by means of oil thrown off the main drive gear 17 and the countershaft gear 22. This improvement in oil circulation of the above-mentioned bearings will now be described.

Referring now in particular to the figure there is shown one of the oil inlet holes or passages 34 positioned diagonally or at an acute angle to the main drive gear 17 for admission of the lubricationg fluid to the pocket or roller bearings 15. Axially opposite to the main drive gear 17 and mounted on the drive shaft 10 is an oil retaining washer or sometimes referred to as an oil sling 35. This oil sling 35 serves to create an area of high oil pressure due to the shroud effect caused by the close proximity of the oil sling to the meshing point of the main drive gear 17 and the countershaft gear 22. As a result of this arrangement the lubricant that is ejected at the meshing point of the gears 15 and 22 is prevented from escaping and thereby is directed radially inward through the slanted oil passages 34 thus effectively serving to lubricate and cool the pocket or roller bearings 15. The oil is then allowed to escape through the oil escape hole 36 to be recirculated.

As a result of my invention the oil inlet holes are so positioned as to fully utilize the pumping action created by the intermeshing of the main drive gear 17 and the countershaft gear 22. This serves to better lubricate the transmission, including the bearing 15.

It must be pointed out that in addition to the above advantages, my invention has not only greatly improved the lubricating system of this transmission, but has considerably increased its longevity.

I wish it to be understood that this invention is not to be limited to the specific construction and arrangement shown and described except only insofar as the claims may be so limited as it will be understood to those skilled in the art that changes may be made without departing from the principles in the invention.

I claim:

1. In a transmission, the combination of a shaft having a pocket formed in the end thereof, a gear carried on said shaft, a second shaft having a pilot bearing with said first named shaft in said pocket of said first named shaft, a second gear in mesh with said first named gear and a washer mounted on said first named shaft and axially opposite to said first named gear, said washer serving to create an area of high pressure due to a shroud effect caused by said washer being axially opposite to the meshing point of the first and second named gears, said first named shaft being provided with passages extending therethrough from points adjacent ends of the teeth of said first named gear and radially from the washer into said pocket for conducting lubricant pumped by said meshing gears from said tooth ends into said pocket for lubricating the pilot bearing.

2. In a transmission, the combination of a shaft having a pocket formed in the end thereof, a gear carried on said shaft, a second shaft having a pilot bearing with said first named shaft in said pocket of said first named shaft, a second gear in mesh with said first named gear and a washer mounted on said first named shaft and axially opposite to said first named gear, said washer serving to create an area of high pressure due to a shroud effect caused by said washer being axially opposite to the meshing point of said first and second named gears, said first named shaft being provided with oil passages which extend at an acute angle through its axes and radially from the washer into the pilot bearing for conducting lubricant pumped by said meshing gears from the said axes into said pocket for lubricating the pilot bearing.

3. In a transmission, a combination of a drive shaft, a drive gear connected to said drive shaft, a driven shaft, a pilot bearing for piloting said driven shaft within said drive gear, a countershaft including a countershaft gear in mesh with said drive gear, lubricating oil for said pilot bearing, said lubricating oil being ejected at the meshing point of said drive gear and said countershaft gear, oil passages which extend diagonally through said drive shaft from said inter-meshing drive and countershaft gears to said pilot bearing for admission of said lubricating oil and a washer mounted on said drive shaft axially opposite to said drive gear and said oil passages, said washer adapted to prevent the escape of said lubricating oil and for directing said lubricating oil radially inward through said oil passages, the intermeshing action of said drive and countershaft gears being utilized as a pump for circulating said lubricating oil that has been placed under high pressure by said meshing of said drive gear with said countershaft gear, thereby effectively serving to lubricate and cool said pilot bearing.

References Cited in the file of this patent

UNITED STATES PATENTS

| | | |
|---|---|---|
| 2,247,732 | Paton | July 1, 1941 |
| 2,406,388 | Larrecq | Aug. 27, 1946 |
| 2,487,350 | Markland | Nov. 8, 1949 |
| 2,645,305 | Roos | July 14, 1953 |